United States Patent
Krueger et al.

(10) Patent No.: US 8,305,269 B2
(45) Date of Patent: Nov. 6, 2012

(54) RADIO SIGNAL-BASED POSITIONING DEVICE AND METHOD

(75) Inventors: Jan M. W. Krueger, Munich (DE); Hans L. Trautenberg, Ottobrunn (DE)

(73) Assignee: Astrium GmbH, Munich (DE)

( * ) Notice: Subject to any disclaimer, the term of this patent is extended or adjusted under 35 U.S.C. 154(b) by 574 days.

(21) Appl. No.: 12/182,805

(22) Filed: Jul. 30, 2008

(65) Prior Publication Data

US 2009/0066573 A1    Mar. 12, 2009

(30) Foreign Application Priority Data

Aug. 1, 2007 (DE) .................. 10 2007 036 498

(51) Int. Cl.
  G01S 5/10    (2006.01)
  G01S 19/40   (2010.01)
(52) U.S. Cl. .................. 342/357.78; 342/357.23
(58) Field of Classification Search ............. 342/357.21, 342/357.35, 357.78, 357.23, 357.44, 357.72
  See application file for complete search history.

(56) References Cited

U.S. PATENT DOCUMENTS

| | | | |
|---|---|---|---|
| 4,797,677 A * | 1/1989 | MacDoran et al. | 342/357.48 |
| 5,323,322 A * | 6/1994 | Mueller et al. | 342/357.72 |
| 6,127,970 A * | 10/2000 | Lin | 342/357.31 |
| 2002/0163467 A1 | 11/2002 | Martikka | |
| 2006/0055596 A1 * | 3/2006 | Bryant et al. | 342/357.06 |
| 2008/0122688 A1 * | 5/2008 | Hatch | 342/357.06 |
| 2008/0204315 A1 * | 8/2008 | Caporali | 342/357.12 |
| 2011/0181462 A1 * | 7/2011 | Lawrence | 342/357.26 |

OTHER PUBLICATIONS

P. S. Jorgensen et al., Combined pseudo range and Doppler positioning for the stationary Navstar user, IEEE Position Location and Navigation Symposium, p. 450-458, Dec. 1980.*
K. Shibuya et al., Determination of Geoid Height at Breid Bay, East Antarctica, Journal of Geophysical Research, vol. 96(B11), p. 18285-18294, Oct. 1991.*
Braasch, M. S., et al., GPS Receiver Architectures and Measurements. In: Proceedings of the IEEE, vol. 87, 1999, No. 1, pp. 48-64.
Office Action with partial English translation dated Feb. 10, 2010 (Five (5) pages).

* cited by examiner

*Primary Examiner* — Jack W Keith
*Assistant Examiner* — Fred H Mull
(74) *Attorney, Agent, or Firm* — Crowell & Moring LLP

(57) ABSTRACT

A radio signal-based positioning device includes a receiver that receives a plurality of radio-transmitted positioning signals, a frequency determiner that determines a frequency of each of the plurality of positioning signals, a send time determiner that determines a send time of each of the plurality of positioning signals, and an evaluation unit that determines a position location from the determined frequencies and send times of the plurality of positioning signals.

9 Claims, 1 Drawing Sheet

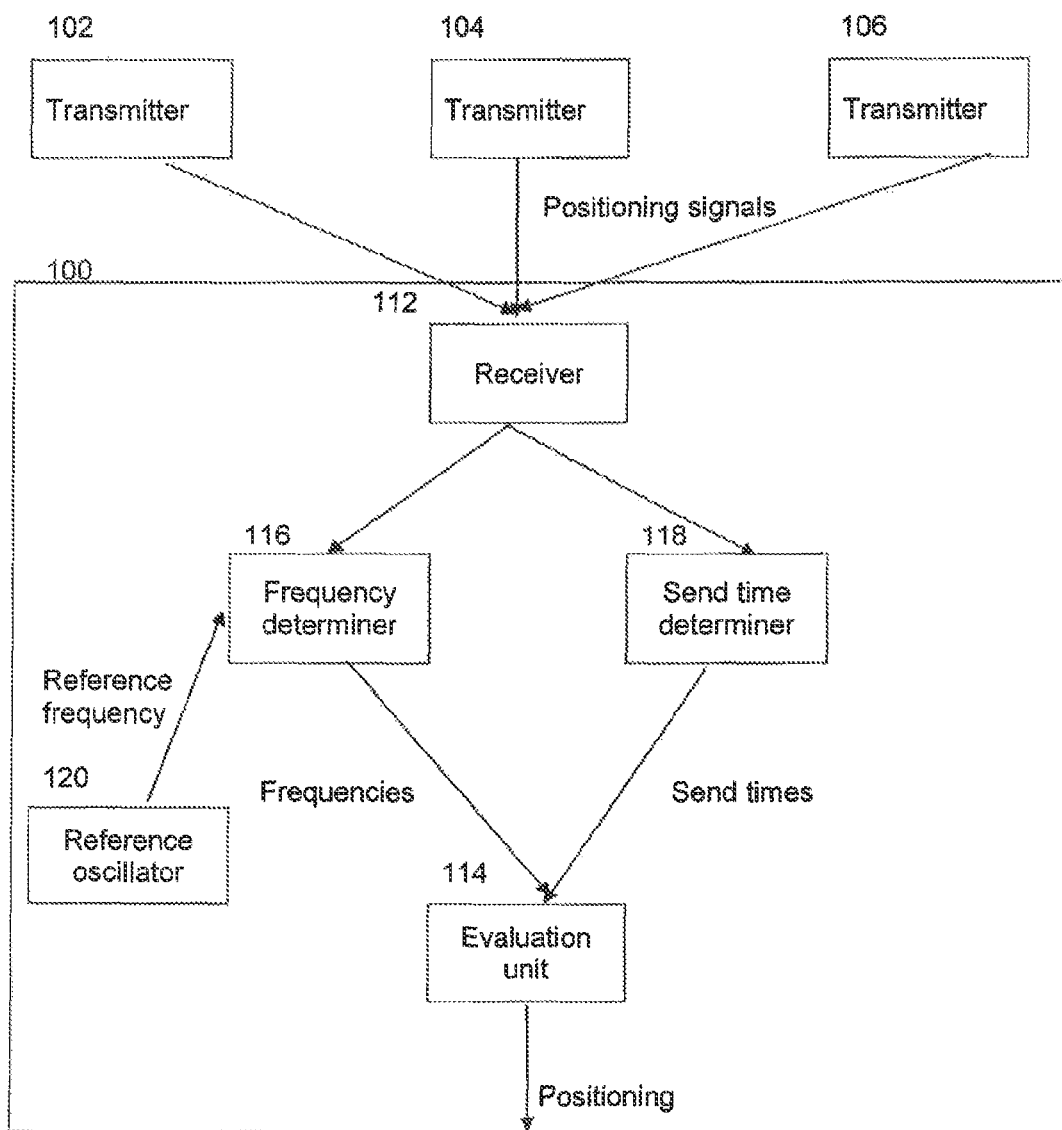

RADIO SIGNAL-BASED POSITIONING DEVICE AND METHOD

CROSS REFERENCE TO RELATED APPLICATIONS

This application claims priority under 35 U.S.C. §119 to German Patent Application No. 10 2007 036 498.0-35, filed Aug. 1, 2007, the entire disclosure of which is herein expressly incorporated by reference.

BACKGROUND AND SUMMARY OF THE INVENTION

The invention relates to a radio signal-based positioning device and a corresponding positioning method which are suitable for use in particular in satellite navigation systems.

Global Navigation Satellite Systems (GNSS) are used for position determination and navigation on the earth and in the air. GNSS systems, such as the European Satellite Navigation System currently under construction (referred to below as "Galileo system" or "Galileo" for short), have a satellite system comprising a plurality of satellites, an earth-based receiver system connected to a central computation station, and utilization systems that evaluate and use the radio-transmitted satellite signals from the satellites.

For positioning, i.e., position determination and/or navigation, the utilization systems receive and evaluate signals from multiple satellites. The signals, in particular their propagation times, may be altered due to influence by the atmosphere. This has an adverse effect on the positioning accuracy.

Conventional positioning systems such as TRANSIT, for example, have been based on Doppler measurements. Due to the long measuring times, these positioning systems required precise modeling of the troposphere and the ionosphere. For this reason the subsequent GNSS generation has used pseudopropagation time measurements for positioning.

Since the current positioning methods use pseudopropagation time measurements for integrity of GNSS systems, such methods require precise modeling of the propagation speed in the troposphere and ionosphere.

The propagation time delays in the ionosphere may be measured with high accuracy using dual-frequency measurement. Two frequencies must be available in order to carry out dual-frequency measurements. This results in reduced continuity of service and decreased system availability.

The tropospheric component represents one error component of GNSS distance measurements which at the present time is difficult to correct. This component results from small-scale localized differences in air pressure and humidity. In the troposphere the influence of the signal propagation time is independent of the frequency, and therefore cannot be determined using a dual-frequency measurement system, as is the case in the ionosphere. The troposphere may be modeled on a global basis. However, global tropospheric models have large modeling errors. For modern GNSS systems these have become the largest error component. It is doubtful whether global tropospheric models can attain the reliability necessary for integrity systems. This reliability may be achievable for large-scale alarm barriers, but represents an unsolved problem for systems having alarm barriers in the range of 20 m.

Exemplary embodiments of the present invention provide a radio signal-based positioning device and method that provide more accurate positioning.

One aspect of the invention involves performing positioning based on the reception frequencies and send times of received radio-transmitted positioning signals. Exemplary embodiments of the present invention do not require error-prone modeling of the troposphere or dual-frequency measurements. In this manner losses in continuity and availability are avoided. As a result, the interfering characteristics of the troposphere and ionosphere no longer have to taken into account by the alarm barriers for integrity, so that the alarm barriers may be much smaller.

According to one aspect, exemplary embodiments of the present invention relate to a radio signal-based positioning device comprising a receiver that receives a plurality of radio-transmitted positioning signals;

a frequency determiner that determines a frequency of each of the plurality of positioning signals;

a send time determiner that determines a send time of each of the plurality of positioning signals; and an evaluation unit that determines a position location from the determined frequencies and send times of the plurality of positioning signals.

The plurality of positioning signals may be transmitted by transmitters of a global navigation satellite system. This allows the positioning device to be used, for example, as a utilization system or terminal in a GNSS system.

The frequency determiner may determine the frequency of each of the plurality of positioning signals, in each case at a reception time of the corresponding positioning signal. In this manner it is possible to detect frequency deviations which occur during the propagation time of the positioning signals.

The positioning device may also have a reference oscillator that provides a reference frequency, and the frequency determiner may determine the frequency of each of the plurality of positioning signals relative to the reference frequency. The frequency may be precisely measured using the reference oscillator.

Useful data may be transmitted via the plurality of positioning signals, and the send time determiner may determine the send time of each of the plurality of positioning signals from the useful data in the respective positioning signal.

The receiver may receive multiple positioning signals, and the evaluation unit may determine the position location from the determined multiple associated frequencies and send times. In the general case seven navigation signals are used. If a model of the earth's surface is available, only five signals are needed according to the invention. For one-dimensional motions, for example on a track, three measurements are sufficient for the invention.

The invention is further described below for the case of seven navigation signals. However, this is not intended to limit the invention to this case.

The evaluation unit may determine a position, a speed, and the reference frequency. As a rule this involves a three-dimensional position and a three-dimensional speed. For applications on the earth's surface using a digital terrain model, a two-dimensional position and a two-dimensional speed, for example, would be determined.

The invention is further described for the three-dimensional case. However, this is not intended to limit the invention to this case.

Exemplary embodiments of the present invention also relate to a system for navigation or position determination, comprising a plurality of transmitters that emit positioning signals; and at least one of the aforementioned positioning device according to exemplary embodiments of the present invention.

Exemplary embodiments of the present invention also relate to a radio signal-based positioning method comprising the following steps:

receiving a plurality of radio-transmitted positioning signals;

determining of a frequency of each of the plurality of positioning signals;

determining of a send time of each of the plurality of positioning signals; and determining of a position location from the determined frequencies and send times of the plurality of positioning signals.

Exemplary embodiments of the present invention also relate to a computer program for carrying out a positioning method according to an embodiment of the present invention, and a computer program product containing a machine-readable program medium on which a computer program according to an embodiment of the present invention is stored in the form of electronically and/or optically readable control signals.

Other objects, advantages and novel features of the present invention will become apparent from the following detailed description of the invention when considered in conjunction with the accompanying drawings.

BRIEF DESCRIPTION OF THE DRAWINGS

Further advantages and application possibilities of the present invention result from the following description in conjunction with the exemplary embodiment illustrated in the single drawing. The single drawing shows a positioning device according to one exemplary embodiment of the present invention.

Identical and/or functionally equivalent elements may be provided with the same reference numerals in the discussion below. The absolute values and dimensions stated below are by way of example only, and do not limit the invention to such dimensions.

DETAILED DESCRIPTION OF THE DRAWINGS

The FIGURE shows a system for position determination or navigation, which according to one exemplary embodiment of the present invention comprises a positioning device 100 and transmitters 102, 104, 106. The system may be a GNSS system, such as, for example, the Galileo system. In this case the transmitters 102, 104, 106 may be satellites, and the positioning device 100 may be a terminal which allows positioning on the earth or in the air. For this purpose the transmitters 102, 104, 106 may be designed to emit positioning signals. The positioning signals may be received and used by the positioning device 100 to determine and provide a position location of the positioning device 100.

The number of transmitters 102, 104, 106 is illustrated here only as an example. For example, at the time of the positioning the positioning device 100 may require positioning signals from more than the three different transmitters 102, 104, 106 shown in order to carry out the positioning.

The positioning device 100 has a receiver 112, an evaluation unit 114, a frequency determiner 116, and a send time determiner 118.

The receiver 112 receives a plurality of positioning signals. According to the exemplary embodiment shown in the FIGURE, the receiver 112 receives one respective positioning signal from transmitters 102, 104, 106. The receiver 112 also provides the received signals, or regions or contents of the received signals for evaluation, to frequency determiner 116 and send time determiner 118.

The frequency determiner 116 determines a frequency of each received positioning signal. According to this exemplary embodiment, the frequency of the positioning signal received from transmitter 102, the frequency of the positioning signal received from transmitter 104, and the frequency of the positioning signal received from transmitter 106 are determined. The frequencies which the positioning signals have at the particular time they are received are the frequencies that are determined. The frequency determiner 116 is designed to provide the determined frequencies to the evaluation unit 114.

The send time determiner 118 determines a send time of each of the positioning signals. According to this exemplary embodiment, the send time of the positioning signal received from transmitter 102, the send time of the positioning signal received from transmitter 104, and the send time of the positioning signal received from transmitter 106 are determined. The send time determiner 118 is designed to provide the determined send times to the evaluation unit 114.

It is important to note that the send time determiner needs to determine the send time only with enough accuracy to allow the send location to be determined from the orbit model with the required accuracy. Thus, the required accuracy for determining the send time is several orders of magnitude less than for measurements of light propagation time.

The evaluation unit 114 determines the position location from the frequencies and send times of the received positioning signals provided by the frequency determiner 116 and the send time determiner 118, respectively. To this end, the evaluation unit 114 may execute a predetermined algorithm by means of which the position location may be determined from the provided frequencies and send times.

The frequency determiner 116 may determine the frequencies of the received positioning signals relative to a reference frequency and provide same to the evaluation unit. For this purpose the positioning device 100 may have a reference oscillator 120 which provides the reference frequency to the frequency determiner 116.

According to a further aspect, the positioning signals transmitted by transmitters 102, 104, 106 may be carriers of useful data. The respective send time of a positioning signal may be embedded in the transmitted useful data, and the send time determiner 118 may determine the send times from the useful data in the respective positioning signals.

According to one aspect, the position location is based on seven positioning signals which originate from seven different transmitters (only three transmitters are shown in the FIGURE). To this end, the receiver 112 is designed to receive the seven positioning signals from the seven different transmitters. The frequency determiner 116 and the send time determiner 118 accordingly determine the corresponding seven frequencies, relative to a localized reference frequency, and the send times, and provide same to the evaluation unit 114. The evaluation unit 114 determines the position location from the seven provided frequencies and send times. For the position location, a three-dimensional position, a three-dimensional speed, and the reference frequency in relation to the positioning device 100 may be determined by the evaluation unit 114.

In other words, the frequencies of the received GNSS signals can be determined relative to a localized reference oscillator. In addition, the send time of the signal whose instantaneous reception frequency is measured may be determined from a data stream of each individual GNSS signal.

In such a system, for a position location seven unknown variables must be determined: namely, the three-dimensional position, the three-dimensional speed, and the reference frequency. This means that, at the minimum, measurements are necessary from seven satellites. The received frequency is influenced by the troposphere and the ionosphere only as the result of changes in the propagation time during the measurement. For a sufficiently short measuring time, this influence may be controlled to be so small that it no longer represents the largest source of error.

In the system described above, elements 114, 116 and 118 can be implemented by one of more processors. The processors can be a microprocessor that executes the computer program, an application specific integrated circuit (ASIC), field programmable gate array (FPGA), and/or the like.

Positioning methods carried out in the described positioning devices may be provided to the positioning devices in the form of a computer program and carried out by a processor of the positioning devices. The processor can be a microprocessor that executes the computer program, an application specific integrated circuit (ASIC), field programmable gate array (FPGA), and/or the like.

The individual exemplary embodiments are described by way of example, and may be adapted to possible operating environments and also advantageously combined with one another. In particular, the transmitters used and the number and design of the positioning signals used may be adapted to the particular GNSS system in which the positioning device according to the invention or the positioning method according to the invention is used. Thus, for example, it is possible that not all of the received positioning signals are used for determining the position location.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A radio signal-based positioning device, comprising:
   a receiver that receives a plurality of radio-transmitted positioning signals;
   a frequency determiner that determines an instantaneous reception frequency of each of the plurality of positioning signals;
   a send time determiner that determines a send time of each of the plurality of positioning signals whose instantaneous reception frequency is determined by the frequency determiner; and
   an evaluation unit that determines a position location from the determined instantaneous reception frequencies and send times of the plurality of positioning signals using deviations of the determined instantaneous reception frequency of each of the plurality of positioning signals during a propagation time of each of the plurality of positioning signals to correct for influence of a troposphere and ionosphere on the propagation time of each of the plurality of positioning signals.

2. The positioning device according to claim 1, wherein the plurality of positioning signals are transmitted by transmitters of a global navigation satellite system.

3. The positioning device according to claim 1, further comprising a reference oscillator that provides a reference frequency to the frequency determiner, which determines the frequency of each of the plurality of positioning signals relative to the reference frequency.

4. The positioning device according to claim 1, wherein useful data is transmitted via the plurality of positioning signals, and wherein the send time determiner determines the send time of each of the plurality of positioning signals from the useful data in the respective positioning signal.

5. The positioning device according to claim 1, wherein the receiver receives seven positioning signals, and wherein the evaluation unit determines the position location from the determined seven associated frequencies and send times.

6. The positioning device according to claim 5, wherein the evaluation unit determines a position, a speed, and the reference frequency.

7. A system for navigation or position determination, comprising:
   a plurality of transmitters that emit radio-transmitted positioning signals; and
   at least one positioning device comprising:
   a receiver that receives a plurality of radio-transmitted positioning signals;
   a frequency determiner that determines an instantaneous reception frequency of each of the plurality of positioning signals;
   a send time determiner that determines a send time of each of the plurality of positioning signals whose instantaneous reception frequency is determined by the frequency determiner; and
   an evaluation unit that determines a position location from the determined instantaneous reception frequencies and send times of the plurality of positioning signals using deviations of the determined instantaneous reception frequency of each of the plurality of positioning signals during a propagation time of each of the plurality of positioning signals to correct for influence of a troposphere and ionosphere on the propagation time of each of the plurality of positioning signals.

8. A radio signal-based positioning method comprising the steps of:
   receiving a plurality of radio-transmitted positioning signals;
   determining an instantaneous reception frequency of each of the plurality of positioning signals;
   determining a send time of each of the plurality of positioning signals whose instantaneous reception frequency is determined; and
   determining a position location from the determined instantaneous reception frequencies and send times of the plurality of positioning signals using deviations of the determined instantaneous reception frequency of each of the plurality of positioning signals during a propagation time of each of the plurality of positioning signals to correct for influence of a troposphere and ionosphere on the propagation time of each of the plurality of positioning signals.

9. A computer program product containing a machine-readable program medium on which a computer program is stored, wherein when the computer program is executed by a processor, the processor:
   receives a plurality of radio-transmitted positioning signals;
   determines an instantaneous reception frequency of each of the plurality of positioning signals;
   determines a send time of each of the plurality of positioning signals whose instantaneous reception frequency is determined; and
   determines a position location from the determined instantaneous reception frequencies and send times of the plurality of positioning signals using deviations of the determined instantaneous reception frequency of each of the plurality of positioning signals during a propagation time of each of the plurality of positioning signals to correct for influence of a troposphere and ionosphere on the propagation time of each of the plurality of positioning signals.

* * * * *